United States Patent [19]

Knauss

[11] Patent Number: 5,138,693

[45] Date of Patent: Aug. 11, 1992

[54] ELECTRIC FLUID HEATER WITH THERMOSPHONIC FLUID CIRCULATION

[75] Inventor: Hermann Knauss, Oberderdingen, Fed. Rep. of Germany

[73] Assignee: E.G.O. Elektro-Gerate Blanc u. Fischer, Fed. Rep. of Germany

[21] Appl. No.: 453,006

[22] Filed: Dec. 18, 1989

Related U.S. Application Data

[63] Continuation of Ser. No. 29,529, Mar. 23, 1987, abandoned.

[30] Foreign Application Priority Data

Mar. 26, 1986 [DE] Fed. Rep. of Germany ....... 3610235

[51] Int. Cl.$^5$ .......................... F24H 1/10; F24H 1/22; A47J 27/00; H05B 1/02
[52] U.S. Cl. .................... 392/445; 134/107; 219/436; 219/438; 219/439; 219/441; 392/461; 392/462; 392/480; 392/482
[58] Field of Search .............................. 219/310–312, 219/314, 297, 436, 438, 439, 441, 442; 134/107; 392/441, 444, 445, 458, 461, 462, 480, 482

[56] References Cited

U.S. PATENT DOCUMENTS

| | | | |
|---|---|---|---|
| 696,599 | 4/1902 | Shoenberg et al. | 219/311 X |
| 817,593 | 4/1906 | Shipp | 219/297 |
| 852,854 | 5/1907 | Shoenberg | 219/314 X |
| 888,151 | 5/1908 | Fiddes et al. | 219/312 |
| 1,778,620 | 10/1930 | Barta | 134/186 UX |
| 1,791,095 | 2/1931 | Hicks | 219/297 X |
| 1,825,793 | 10/1931 | Heroy . | |
| 2,251,411 | 8/1941 | Metzgar | 219/311 |
| 2,519,920 | 8/1950 | Miner | 219/301 |
| 2,582,103 | 1/1952 | Clegg | 219/311 |
| 2,914,935 | 12/1959 | Sampsel | 68/16 X |
| 3,126,469 | 3/1964 | Feldmann et al. | 219/297 X |
| 3,247,359 | 4/1966 | Feld | 219/301 X |
| 3,378,933 | 4/1968 | Jenkins | 134/107 X |
| 3,636,308 | 1/1972 | Hatch | 219/306 X |
| 4,169,978 | 10/1979 | Hauslein | 219/292 |
| 4,326,552 | 4/1982 | Bleckmann | 134/99 |
| 4,401,156 | 8/1983 | Wojtecki et al. | 219/301 |
| 4,574,183 | 3/1986 | Knauss | 219/439 X |
| 4,590,361 | 5/1986 | Del Fabro | 219/439 |
| 4,602,612 | 7/1986 | Schwizer . | |
| 4,625,096 | 11/1986 | Fletcher | 219/296 X |
| 4,644,140 | 2/1987 | Hillinger | 219/301 |

FOREIGN PATENT DOCUMENTS 346014 10/1978 Australia .
185874 10/1985 European Pat. Off. .
618004 8/1935 Fed. Rep. of Germany .

(List continued on next page.)

Primary Examiner—Anthony Bartis
Attorney, Agent, or Firm—Quarles & Brady

[57] ABSTRACT

A fluid heater having a fluid chamber with a base wall and an upright sidewall is positioned above a feed chamber having an upper wall. A plurality of identical tubular passage heaters, each having an upper outlet end connected to the fluid chamber base wall and an inlet end connected to the upper wall of the feed chamber, are disposed in at least one lateral protective niche recessed with respect to the fluid chamber upright wall. Return ducts located inwardly of the passage heaters connect the base wall of the fluid chambers to the upper wall of the feed chamber. Thermostatically controlled electric heating elements helically disposed on the passage heaters produce a thermosphonic circulation of fluid from the feed chamber through the passage heaters to the fluid chamber and back to the feed chamber through the return ducts. The heating capacity of the fluid heater can be varied within wide limits by energizing different numbers of passage heaters. The passage heaters are removable to allow thorough cleaning of the fluid heater, which may be used as a deep fryer, water heater, or the like.

35 Claims, 9 Drawing Sheets

FOREIGN PATENT DOCUMENTS

| | | |
|---|---|---|
| 640130 | 12/1936 | Fed. Rep. of Germany . |
| 299517 | 7/1917 | Fed. Rep. of Germany . |
| 1718742 | 10/1955 | Fed. Rep. of Germany . |
| 6601083 | 8/1966 | Fed. Rep. of Germany . |
| 6601550 | 3/1969 | Fed. Rep. of Germany . |
| 2412257 | 9/1975 | Fed. Rep. of Germany . |
| 2638380 | 3/1978 | Fed. Rep. of Germany . |
| 7633515 | 4/1979 | Fed. Rep. of Germany . |
| 8121389 | 7/1981 | Fed. Rep. of Germany . |
| 8026931 | 3/1982 | Fed. Rep. of Germany . |
| 3221348 | 12/1983 | Fed. Rep. of Germany . |
| 3241008 | 5/1984 | Fed. Rep. of Germany . |
| 3329793 | 2/1985 | Fed. Rep. of Germany . |
| 3518565 | 11/1986 | Fed. Rep. of Germany . |
| 3526186 | 2/1987 | Fed. Rep. of Germany . |
| 857463 | 4/1940 | France . |
| 887455 | 11/1943 | France .................. 219/311 |
| 1374218 | 11/1963 | France . |
| 1526903 | 5/1968 | France . |
| 2491321 | 4/1982 | France . |
| 27632 | 4/1933 | Netherlands ......................... 219/439 |
| 300000 | 7/1954 | Switzerland . |
| 404889 | 7/1966 | Switzerland ......................... 134/107 |
| 629948 | 5/1982 | Switzerland . |
| 477635 | 1/1938 | United Kingdom ................ 219/314 |
| 1038837 | 8/1966 | United Kingdom . |

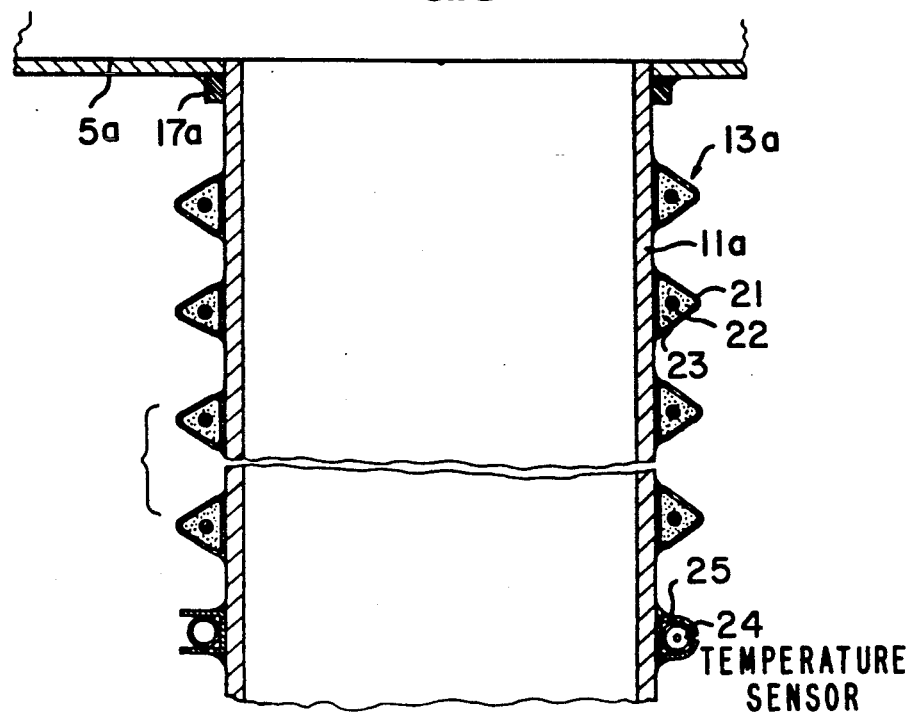
FIG.3
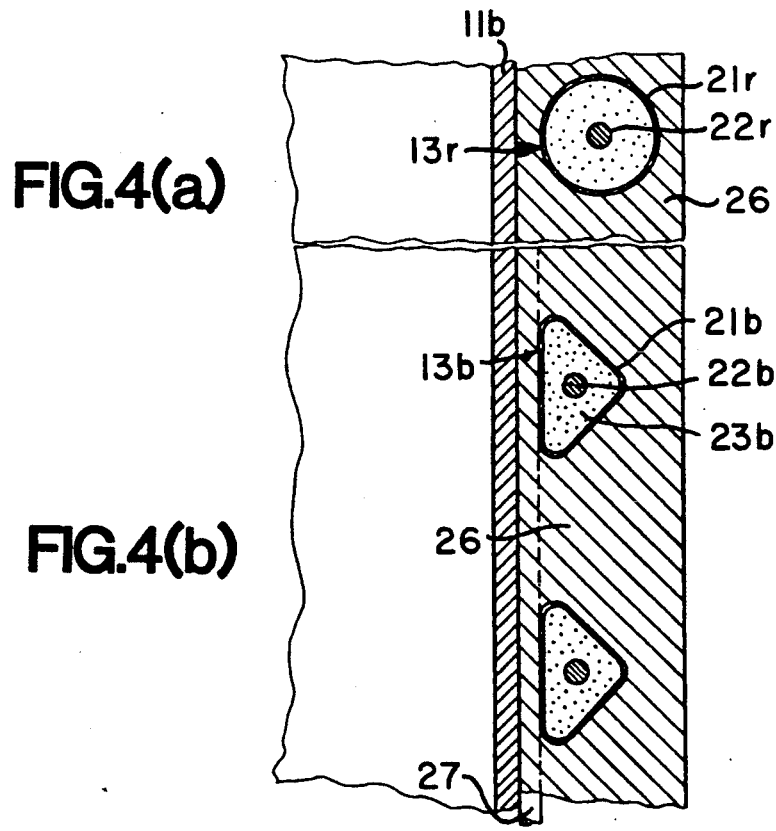
FIG.4(a)
FIG.4(b)

ELECTRIC FLUID HEATER WITH THERMOSPHONIC FLUID CIRCULATION

CROSS REFERENCE TO RELATED APPLICATION

This is a continuation of application Ser. No. 029,529, filed Mar. 23, 1987, now explicitly abandoned.

BACKGROUND OF THE INVENTION

1. Field of the Invention

The invention relates to a fluid heater comprising at least one electrically heated flow passage associated with a fluid chamber.

2. Prior Art

German Offenlegungsschrift 32 41 008 describes fluid heater provided for a deep fat fryer, in which a separate passage with an electrical heating system is arranged laterally of the fat container provided as the fluid chamber. The electric heating system is connected to the fat container by superimposed transverse pipes in such a way that it receives fat through the upper transverse pipe from an upper area of the chamber, heats it and then returns it into the fat container through the lower transverse pipe in a lower area of the chamber. Although this leads to a very effective circulation of the fat through the fat container, such a fryer is particularly unsuitable in those cases where the installed heating capacity or power of the fryer is particularly high.

SUMMARY OF THE INVENTION

The object of the invention is to provide a deep fat fryer of the aforementioned type making it possible, through the choice of the number of heated flow channels used, and while using the same basic components, to install different heating capacities.

In the case of the fluid heater of the aforementioned type, this object is achieved in that the flow passage is formed by at least one tubular passage heater having a lower inlet and an upper outlet. Therefore it is possible to fit widely differing numbers of identical passage heaters to the same fluid chamber so that, e.g., in the case of an individual passage heater capacity of approximately 1.5 KW each, integral multiples of said capacity up to approximately 24 KW and higher can be installed. It is merely necessary to provide the fluid chamber with a corresponding number of connections for the duct heaters, the arrangement being such that connections which are not required can be closed with blank covers or the like.

As the inventive arrangement of the passage heater permits operation solely on the basis of the thermal siphon effect, the passage heaters can be substantially, and in particular completely, arranged on the underside of the fluid chamber in an very space-saving manner. Equally easy access over the entire circumference of the fluid chamber is possible from all sides.

Another important advantage of the invention is that the upper outlet of the passage heater can be made such that it is accessible from above, and is in particular located in a horizontal plane, namely, e.g., in a base wall of the fluid chamber. Thus, the passage heaters can be very thoroughly cleaned over substantially their entire length by means of a brush or the like inserted from above. This is in particular the case if the outlet is formed by the upper pipe end and the inlet by the lower pipe end of the passage heater, i.e., if no transverse pipes branch off the outer casing of the passage heater.

The passage heaters can also be arranged in a simple manner, particularly each individually, so that each can be removed as a separate subassembly. Thus preferably the two ends of the passage heaters are detachably fixed by means of plug, flange, screw, self-sealing snap or other connecting means. In the case of repairs, on the one hand, very rapid replacement of individual passage heaters is possible and on the other even more thorough cleaning can be carried out.

The passage heaters are appropriately located adjacent to the outer circumference of a fluid return duct as fluid shafts located on the underside of the fluid chamber, so that viewed in plan view on the fryer, they at no point project beyond the outer circumference thereof.

The inventive construction is suitable for fluid heaters with a random basic shape, i.e., for example rectangular or square fluid heaters. However, the inventive construction is particularly advantageous for round, particularly circular fluid chambers, the outlets of all the passage heaters being preferably provided in the base wall, which connects in shoulder-like manner to the casing wall of the fluid chamber.

A particularly advantageous further development of the invention is that a heating resistor, particularly a tubular heater, is positioned outside the passage heater duct through which the fluid flows, preferably on the outer circumference of a passage heater pipe and is preferably connected thereto in highly thermally conductive, e.g., metallic, connecting manner. However, it is also conceivable instead of this, or in addition thereto, to provide a heating resistor in the interior of the pipe, appropriately an inner pipe being arranged within said pipe which separates the annular clearance-like flow passage of the continuous heater from the heating resistor arranged on its inner circumference. Passage heater constructions are described in German patent applications P 35 26 186.2 (U.S. Pat. No. 4,825,043, P 35 18 565.1 (U.S. Pat. No. 4,949,556) and P 35 41 641.6, to which reference should be made for further details.

As a result of the inventive construction, in the case of a fluid heater with a fluid chamber width of, e.g., approximately 470 mm, it is possible to arrange a relatively large number of passage heaters, e.g., between 6 and 20 and in particular between 8 and 16 heaters, so that it is possible to obtain a very uniform fluid flow in the fluid chamber, including uniform distribution thereof about the central axis of the container. The total fluid heater height is, e.g., approximately 560 mm in the indicated case and exceeds the fluid chamber width, but the fluid shaft and in particular the passage heater has a height less than that of the fat container. The diameter of the passage heaters or their pipes can be approximately 1/10 of the fluid chamber width, the heaters appropriately having a pipe diameter of 50 mm. The radial extension of the shoulder-like base wall of the fluid chamber is appropriately at least 50% larger than this.

These and further objects and features of the invention can be gathered from the following description and drawings. The individual features can be realized in embodiments of the invention and in other fields, either single or in the form of random combinations.

BRIEF DESCRIPTION OF THE DRAWINGS

Various embodiments of the invention are shown in the accompanying drawings.

FIG. 3 is a detail of a passage heater in axial section.

FIGS. 4(a) and 4(b) are axial sectional details of other embodiments of passage heaters.

DETAILED DESCRIPTION OF THE PREFERRED EMBODIMENTS

Figure 1:
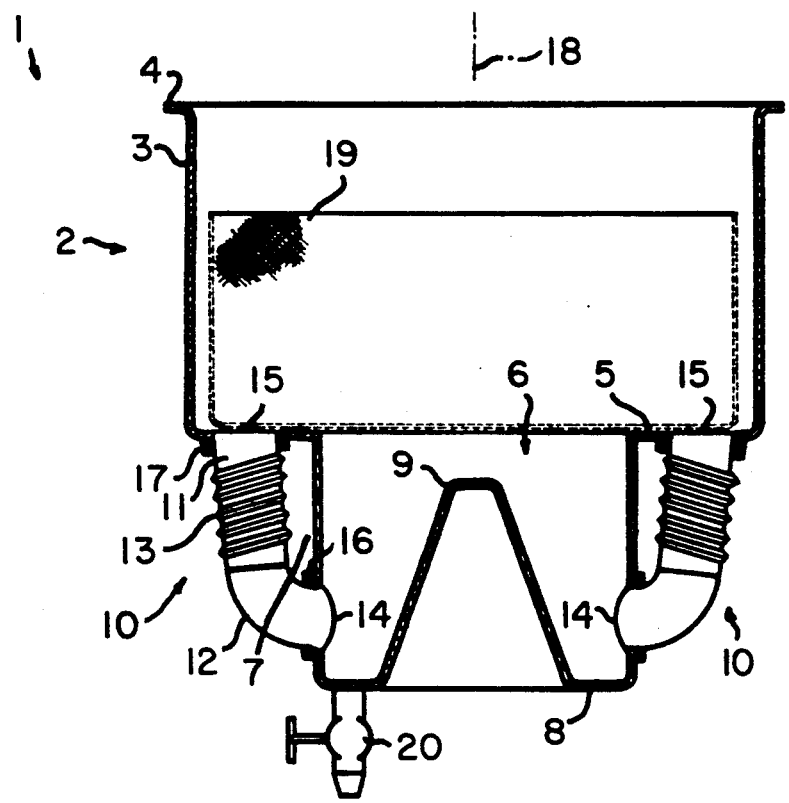
FIG. 1 is an axial section through an inventive fluid heater provided as a deep fat fryer.
Figure 2:
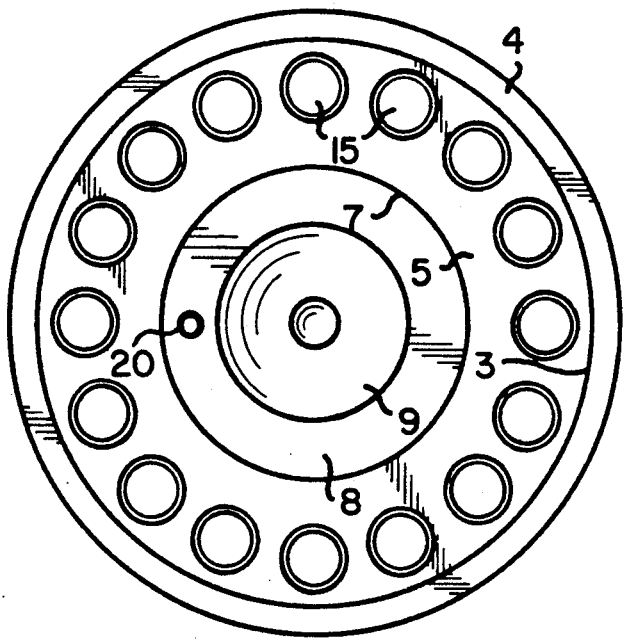
FIG. 2 is the fluid heater according to FIG. 1 in plan view.

The fluid heater 1 forming a deep fat fryer according to FIGS. 1 and 2, has a substantially cylindrical fat container forming a fluid chamber 2. The cylindrical casing wall 3 of the fluid chamber 2 has, at the upper end, an outwardly directed marginal flange 4 and, at the lower end, an inwardly directed annular or ring-like shoulder-like base wall 5. Casing wall 3 is the upright outer side wall, defining a width extension and a height extension of fluid chamber or fat container 2. A fluid or fat shaft 6 is connected to the base wall 5. Shaft 6 is constructed in one piece with base wall 5 or formed by a separate component which has the same basic shape as base wall 5, so that the width of the latter is constant over the entire periphery. The substantially cylindrical casing wall 7 of the fluid shaft 6 is positioned coaxially with central axis 18 of fat container 2. The diameter of casing wall 7 is smaller compared with casing wall 3 by twice the closest distance from casing wall 7 to casing wall 3 at base wall 5. Casing wall 7 has a smaller height than casing wall 3 and is located completely below the top surface of base wall 5, so that apart from casing wall 3 no parts project upwardly past the upper outlet opening 15 of passage heater 10, beyond the top surface of base wall 5. The casing wall 7 of fluid shaft 6 defines an upright intermediate wall or intermediate member between fat or fluid container 2 and a feed chamber area at the bottom of fat or fluid shaft 6. The lower end of casing wall 7 is an annular disk-like base wall 8 disposed at a right angle to central axis 18, defining a lower inlet opening 14 to passage heater 10. Base wall 8 centrally carries a guide and displacer 9 which tapers upwards in acute-angled frustrum-shaped manner. Displacer 9 is constructed in one piece with base wall 8 or is formed by a separate, and in particular, hollow body arranged in sealed manner on base wall 8. The height of displacer 9 located coaxially with the central axis 18, is smaller than that of fluid shaft 6, so that its upper end face is located with a limited spacing below the level of base wall 5, on which a basket rests. The diameter of displacer 9 in the vicinity of its upper end is roughly the same as the width of a radial segment of the annular disk-like base wall 8.

A plurality of identical continuous respective passage heaters 10 are disposed around fluid shaft 6, uniformly distributed about central axis 18 at the feed chamber, such that the passage heaters 10 reside in a lateral outer niche below fluid container 2 and adjacent wall 7 of the feed chamber, laterally recessed relative to the upright outside wall or casing wall 3.

In the represented embodiment there are sixteen such continuous heaters 10. Each is in an axial plane of central axis 18, so that in each case, two facing heaters 10 are located in a common axial plane. The spacings between adjacent continuous heaters 10 can be smaller than the external diameters thereof.

Each continuous heater 10 has a linear, cylindrical pipe 11, to whose lower end is connected an approximately right-angle pipe bend 12, which is constructed in one piece with pipe 11, is formed by a separate component of the same diameter connected in non-detachable manner to pipe 11 or can be fixed to the associated end of pipe 11 by means of an easily detachable pipe connection so as to be equiaxial thereto. Pipes 11 are arranged at identical, upwardly opening acute angles to central axis 18 and are connected by their upper ends directly to base wall 5. The lower ends of the pipe bend 12 are directed against central axis 18 and are directly connected to the casing wall 7 of fat shaft 6. Thus, the lower or inner ends of pipe bend 12 form inlets 14, which are open towards the annular passage between casing wall 7 and displacer 9 and whose central axes are approximately at right angles to the central axis 18. Inlets 14 are positioned at a distance above base wall 8 which roughly corresponds to the inside diameter thereof, so that an annular sump zone is formed between inlets 14 and base wall 8 for the deposition of solids and sediment. The upper ends of pipes 11 form outlets 15, which are located in the plane of the top surface of base wall 5 and are always accessible from the upper wall opening of fat container 2. The inwardly directed ends of the pipe bend 12 are sealed by means of connection 16 and fixed to casing wall 7, the connection 16 being accessible from the outside of fat shaft 6 for releasing continuous heater 10. The upper ends of pipes 11 are detachably fixed to base wall 5 by means of corresponding connections 17, which are accessible from the underside of base wall 5. The width extension or external diameter of pipes 11 is smaller than the width of base wall 5, so that its upper end, in plan view on the deep fat fryer, is radially spaced from the inside of casing wall 3 and also from the outer circumference of casing wall 7. These spacings are smaller than the external diameter of pipe 11 and are approximately half as large. The base wall of a deep fat fryer basket 19 can be placed on base wall 5, the basket 19 having a slightly smaller width than fat container 2 and a smaller height than the latter. The removable basket 19 covers the outlets 15 of continuous heater 10 with its screen-like, penetrable base wall.

A fat drain 20 is provided on the base wall 8 of fat shaft or fluid shaft 6, and can be closed, e.g., by a valve, the drain 20 being positioned in spaced manner below inlets 14.

An electrical heating resistor 13 helically surrounds the pipe section 11 of each continuous heater 10, the heating resistor 13 extending over the major part of the length of pipe 11, but not into the area of the associated pipe bend 12. Heating resistor 13 is appropriately formed by a tubular heater helically arranged on the outer circumference of metal pipe 10 in good thermally conducting connection, so that the fat does not come into direct contact with the tubular heater. On energizing the continuous heater 10 by means of a power control device, as a result of the thermal siphon action, the fat is sucked through the inlets 14 within fat shaft 6 or the annular passage-like thereof and then, after heating in the vicinity of pipe 11, the fat is led out upwards through inlets 15 into fat container 2. The fat initially passes along casing wall 3 and then, in an arcuately inwardly directed flow along central axis 18 back downwards against displacer 9 which, as a result of its shape, supplies the fat to each inlet 14. Thus, the fat flows in a ring-shaped, rolling path through fat container 2 and each continuous heater 10. The flow into fat shaft 6 is centrally divided by the central displacer 9 and is uniformly outwardly deflected over the circumference. It is also possible to provide no displacer 9, making the base wall 8 planar throughout. However this leads to a higher fat capacity than otherwise necessary for economical operation of fryer 1.

As shown in FIG. 3 the heating resistors 13a are appropriately formed by tubular heaters which, in a thin-walled, tubular, metal casing 21, have a heating conductor 22 embedded in an insulating material 23 in contact-free manner with respect thereto. Although cross-sectionally circular tubular heaters are conceivable, as shown at 13r in FIG. 4a, it is appropriate if the tubular heaters have, in cross-section, a flattened side 13b, by which they engage on the associated surface of pipe 11a and can be fixed to said surface, e.g., by soldering material. Such a flattening is in particular obtained with cross-sectionally triangular, particularly roughly equilateral triangular construction of the tubular heater 21b. The helical tubular heater 21b, prior to assembly, can be so pre-bent on pipe 11a, that its internal diameter is slightly smaller than the external diameter of pipe 11a and then, accompanied by resilient widening, it is mounted on pipe 11a and then released, so that under its own pretension it closely engages round the outer circumference of pipe 11a and can then be fixed to the pipe in thermally conducting manner, e.g. by soldering or welding. The connections, whereof only connection 17a on base wall 5a is shown in FIG. 3, can be formed by plug connections, e.g., which have a small conical plug seat or fit so that a reliable sealing is ensured. In FIGS. 3 to 8 corresponding parts are given the same reference numerals as in FIGS. 1 and 2, but in FIG. 3 they are followed by a, in FIG. 4b by b and in FIGS. 5 to 8 by c.

As is shown in FIG. 3, a temperature sensor 24 may be disposed in the vicinity of pipe 11a, particularly above or below heating resistor 13a. The temperature sensor 24 may form part of a power control device or a thermal cutout, which can also prevent running dry. The temperature sensor 24 is part of an hydraulic expansion system, wherein a tubular or rod-shaped sensor is filled with an expansion fluid. The fluid is connected by means of a capillary line to an expansion member acting on a switch. Temperature sensor 24 is appropriately mounted on the outer surface of the heated flow passage defined by pipe 11a in good heat conducting connection therewith, and for this purpose a retaining or carrying profile such as channel member 25, made from a good heat conducting, particularly metallic material is mounted in very good heat conduction with pipe 11a, e.g., by soldering or welding in substantially direct thermally conductive manner. This cross-sectionally U-shaped retaining profile 25 is initially constructed in such a way that the temperature sensor 24 can be inserted in uninterrupted manner essentially over its entire length. After insertion, the profile is closed by shaping, so that it is in close engagement with the outer circumference of temperature sensor 24 and securely holds temperature sensor 24 in a positive manner. In the represented embodiment the legs of the retaining profile 25, fixed by its profile crosshead to pipe 11a, are so bent against the circumference of temperature sensor 24, that their longitudinal edges approximately meet one another.

Heating resistors 13r and 13b according to FIGS. 4(a) and 4(b) respectively are completely embedded in a casting 26, which in turn engages in uninterrupted manner around the outer circumference of pipe 11b in the area between the ends of heating resistor 13b. This may be achieved by using pipe 11b as the inner mould for producing the sleeve-like casting 26, casting 26 directly on pipe 11b. Casting 26 is appropriately made from a material with good heat conducting characteristics, but a relatively low melting point, particularly aluminium, whereas pipe 11b is made from a material which is not sensitive to foodstuffs, particularly stainless steel, which generally does not have particularly good heat conducting characteristics. To prevent a local overheating of the casing of pipe 11b through the coils of heating resistor 13b, 13r, the resistor is not directly located on the outer circumference of pipe 11b and is instead positioned with a limited spacing from the associated surface of pipe 11b. Thus, the heating resistor 13b, 13r, initially heats casting 26, which uniformly distributes the heat to the pipe jacket over its entire length. In order to obtain this spacing of heating resistor 13b, 13r, spacers may be provided in the form of wires 27 arranged in axially parallel manner to pipe 11b, being thereby positioned between the radially inwardly pretensioned heating resistor 13b, 13r and pipe 11b prior to the manufacture of casting 26 and embedded in the casting following the manufacture thereof. Casting 26, which is appropriately also cylindrical on the outer circumference, may be cross-sectionally constructed in such a way that its outer circumferential surface is further from heating resistor 13b as shown in FIG. 4(b) than its inner circumferential surface connected to the outer circumferential surface of pipe 11b. The outer circumference of the continuous heater can be enveloped with insulation to reduce heat losses.

Deep fat fryer 1c according to FIGS. 5 to 8 is elongated and rectangular in plan view and is provided along its longitudinal sides with two facing rows or heater groups of identical continuous heaters 10c. In each case two heaters face one another in groups or pairs and heaters 10c are closely distributed over the entire length of fat container 2c and fat shaft 6c. Fat shaft or fluid shaft 6c is relatively narrow compared with container 2c, having only approximately 1/5 of its width. The fat shaft 6c is therefore free from displacers and extends over the entire length of fat container 2c, i.e., up to the two end walls thereof, and has substantially the same height as container 2c. The lateral longitudinal walls 7c of fat shaft 6c are vertical and parallel to one another. A sump or cold sump is formed in fat shaft 6c below inlets 14c. Outlets 15c are relatively near or immediately adjacent to the casing wall 3c of fat container 2c and therefore as far as possible, or further, from the associated wall 7c of fat shaft 6c.

The continuous passage of each continuous heater 10c is formed by two mitre-cut pipes 11c, 12c having the same diameter. The vertical pipe 11c is much longer than the lower, approximately horizontal pipe 12c. A widened internal cross-section is formed in the transition zone between the two pipes. As can in particular be gathered from FIG. 6, each connection 16c or 17c of the particular continuous heater 10c is formed by a pipe coupling. The latter has a very short pipe connection 28, which projects below base wall 5c or outside of wall 7c and is fixed thereto by insertion. An externally threaded sleeve 31 is mounted on a pipe connection 28, e.g., by brazing, so that its associated end face is substantially located in one plane with the outer end face of pipe connection 28. An outwardly projecting, annular disk-like flanged ring 29 is fixed to the associated end of each pipe 11c or 12c, at a very small distance from the end of pipe connection 28 or threaded sleeve 31. Ring 29 has a slightly smaller external diameter than the thread core diameter thereof. A ring seal or packing 30 is inserted in a frontal annular groove of threaded sleeve 31 and on which the flanged ring 29 engages with pretension. Flanged ring 29 is so tensioned against ring seal 30 by a box nut 32 screwed on to threaded sleeve 31 and engaging in rotary manner behind the same. The gap between pipe connection 28 and the associated pipe 11c or 12c of continuous heater 10c is thereby substantially closed. Threaded sleeve 31 extends almost up to the associated wall 5c or 7c and can also be constructed in one piece with pipe connection 28, so that it is directly inserted in or fixed to the associated wall 5c or 7c. Both threaded sleeve 31 and box nut 32 are circumferentially provided with wrench grooves for a groove wrench, so that when using such tools a very reliable tightening and loosening of the pipe coupling is ensured. The distance between adjacent continuous heaters 10c is the minimum necessary to ensure that the juxtaposed pipe couplings are spaced sufficiently to ensure engagement by a tool. The axial spacing between adjacent continuous heaters 10c is roughly twice their internal cross-section.

Figure 5:
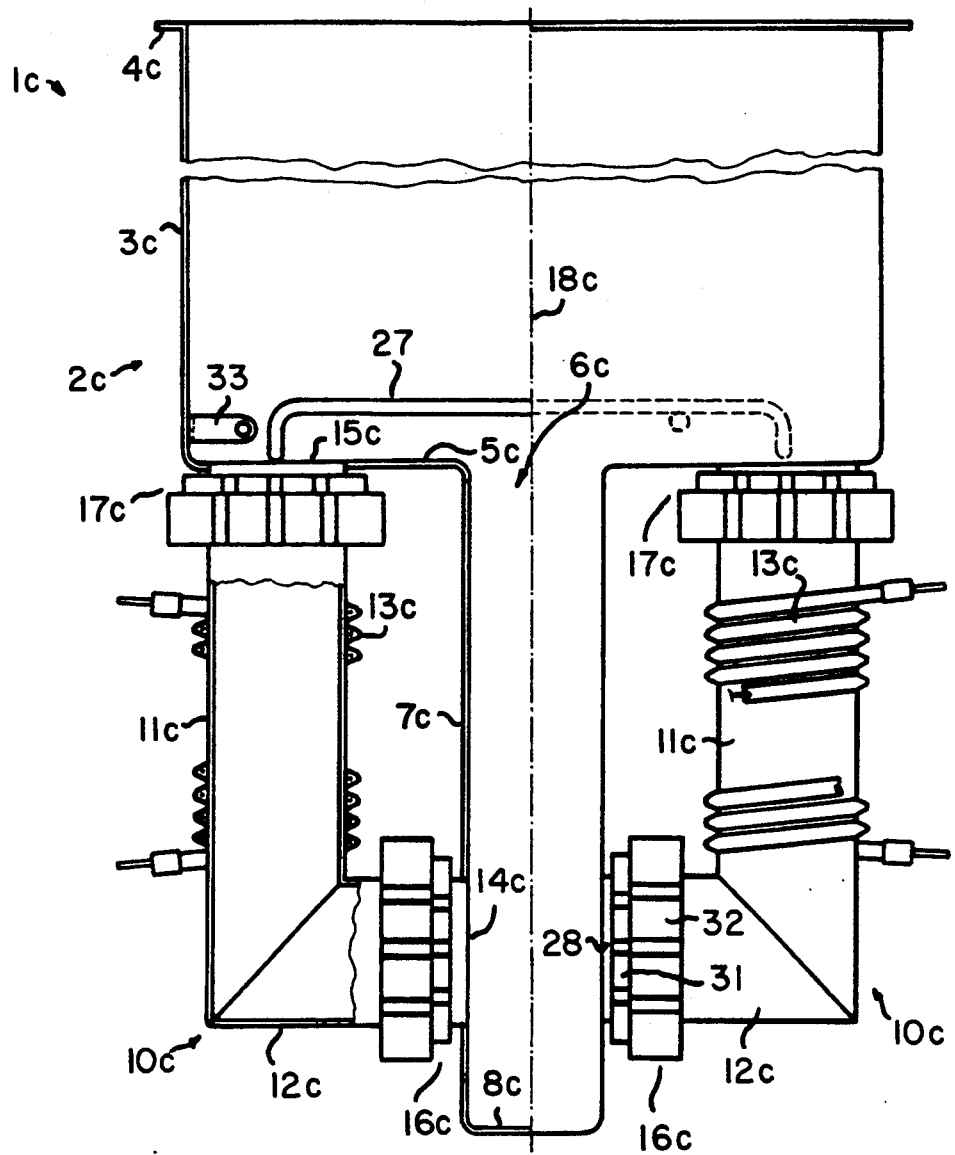
FIG. 5 is a part sectional end view of another embodiment of a deep fat fryer.
Figure 8:
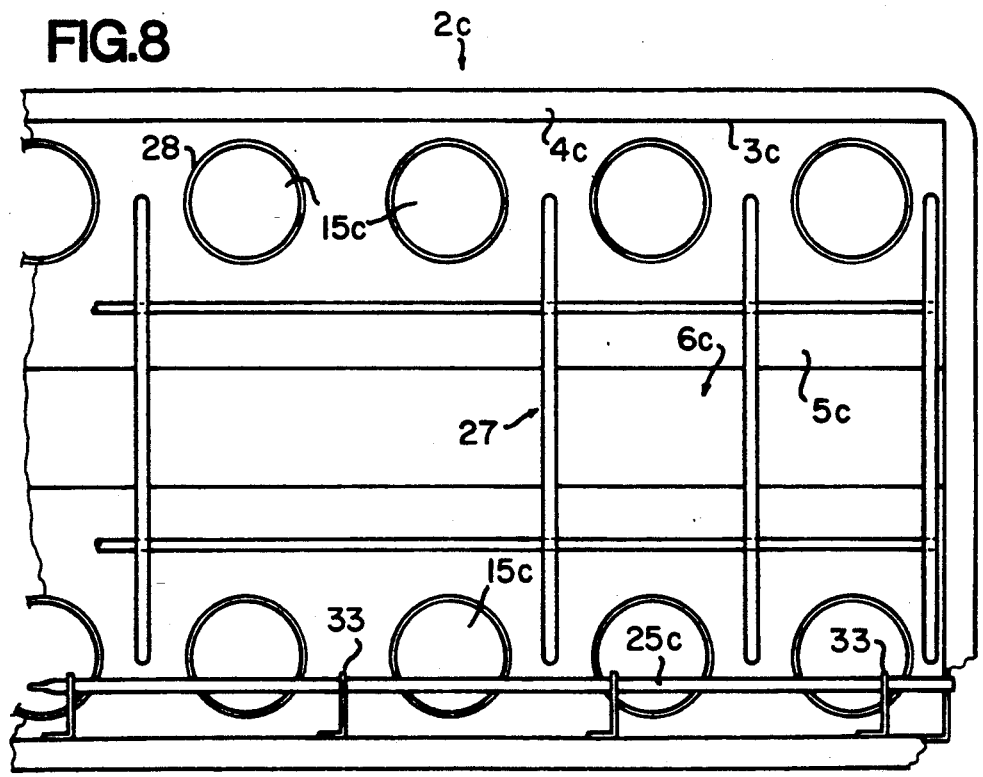
FIG. 8 is a fryer according to FIG. 7 in plan view.

As is also shown by FIGS. 5 and 8 a removable, flat supporting frame 27 is provided on base wall 5c for the fryer basket (not shown). The frame 27 is formed from clips at right angles to the longitudinal direction of fat container 2c and arranged in spaced succession in the longitudinal direction thereof, as well as longitudinal bars connecting their supporting cross webs on the underside and on either side of fat shaft 6c. The lower leg ends of the clips rest between adjacent outlets 15c on base wall 5c.

FIGS. 5 and 8 also show a substantially linear protective pipe 25c mounted closely over base wall 5c and parallel thereto, but located below the supporting surface of supporting frame 27 and which serves to receive a rod-like, temperature sensor (not shown). One end of the protective pipe 25c located within the fat container 2c is closed, while the other end of pipe 25c sealingly traverses the associated end wall of fat container 2c, so that the temperature sensor can be pulled out at any time. Protective pipe 25c is held in place by means of spaced, angular, L-shaped brackets 33. The brackets 33 are so arranged on a longitudinal wall 3c of fat container 2c that the temperature sensor is located in the flow region of the outlets 15c of a plurality of successive continuous heaters 10c. For example, as shown in the plan view according to FIG. 8, the temperature sensor crosses outlets 15c and therefore detects roughly half of the approximately twelve continuous heaters in connection with their outlet temperature. The connecting ends of all the heating resistors 13c are outwardly directed from the fat shaft 6c or the associated median longitudinal plane 18c of deep fryer 1c, so that a simple connection is possible.

Figure 6:
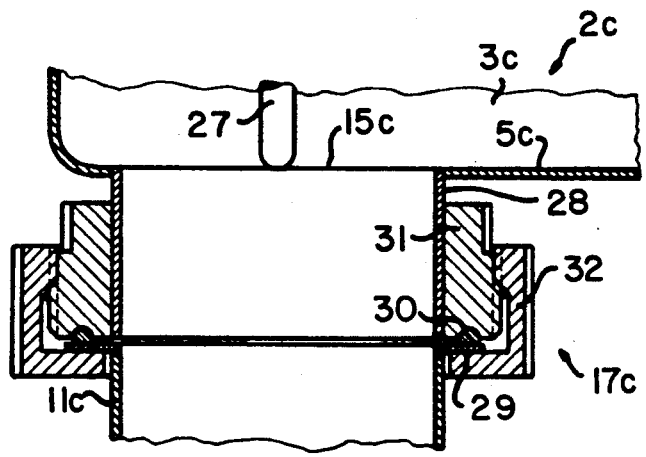
FIG. 6 is a detail of FIG. 5 in a larger scale sectional representation.
Figure 7:
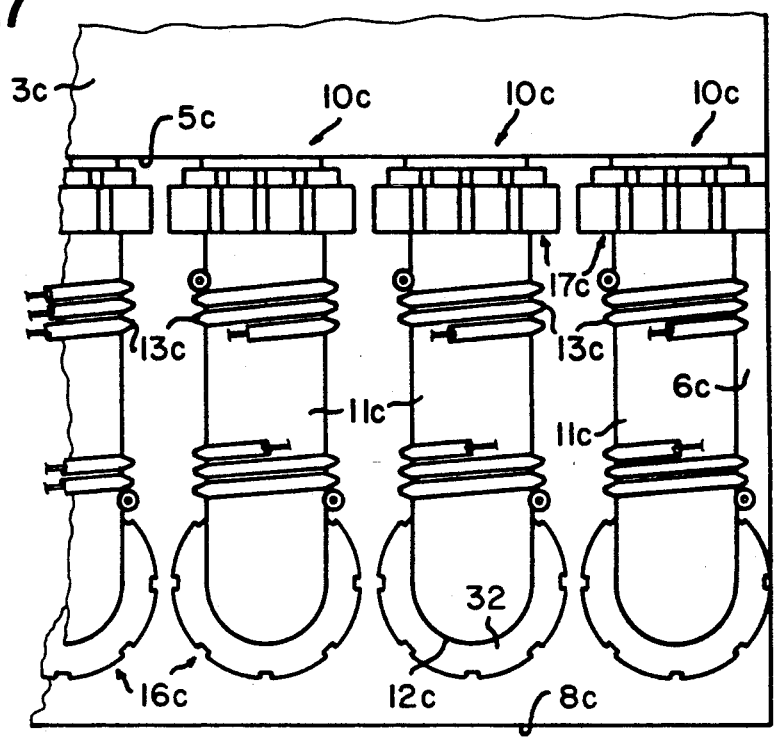
FIG. 7 is a detail of the fryer according to FIG. 5 in side view.

In an embodiment of the passage heater 10c according to FIGS. 5 and 6, it is also possible to use for said passage heater an exclusively linear pipe 11c, limited or cut off at its two ends in substantially rectangular manner to its central axis, through the lower, angular end portion of the passage heater being formed by an angular pipe or two separate pipe sections mitre-joined at an angle, whereof that connected to pipe 11c is bounded at its upper end in substantially rectangular manner to the central axis of pipe 11c. The pipe sections directly connected to pipe 11c can also be welded thereto in butt-joined manner, so that there are substantially only welded joints for fixing the passage heater. However, if a detachable screw connection is provided, it is also conceivable to directly fix the threaded sleeve 31 to base wall 5c or casing wall 7c, instead of the pipe section 28, by welding or the like. Instead of being on the front of flanged ring 29 in the vicinity of or on the outer circumference of pipe 11c, ring seal 30 may be located in a frontal annular slot open towards the threaded sleeve 31, which on the outer circumference and on the bottom can be limited by a cross-sectionally flanged, e.g. angular, ring fixed to the outer circumference of pipe 11c. The flanged ring forms the frontal bearing surface for the cap nut 32. The end of pipe 11c can be directly applied by pressure to the associated end side of the threaded sleeve 31 having the same internal width as pipe 11c. The arrangement is such that the end face of pipe 11c engages in virtually gapless tight manner on the end face of threaded sleeve 31 and the correct sealing pressure of ring seal 30 is thereby obtained. The ring seal 30 is not reached by the fluid and in fact only has to come into action in emergencies when a leak occurs between the metallic bearing surfaces of pipe 11c and threaded sleeve 31.

FIGS. 9 to 19 use substantially the same reference numerals for corresponding parts to those used in the other drawings, but are followed by different letter references.

Figure 9:
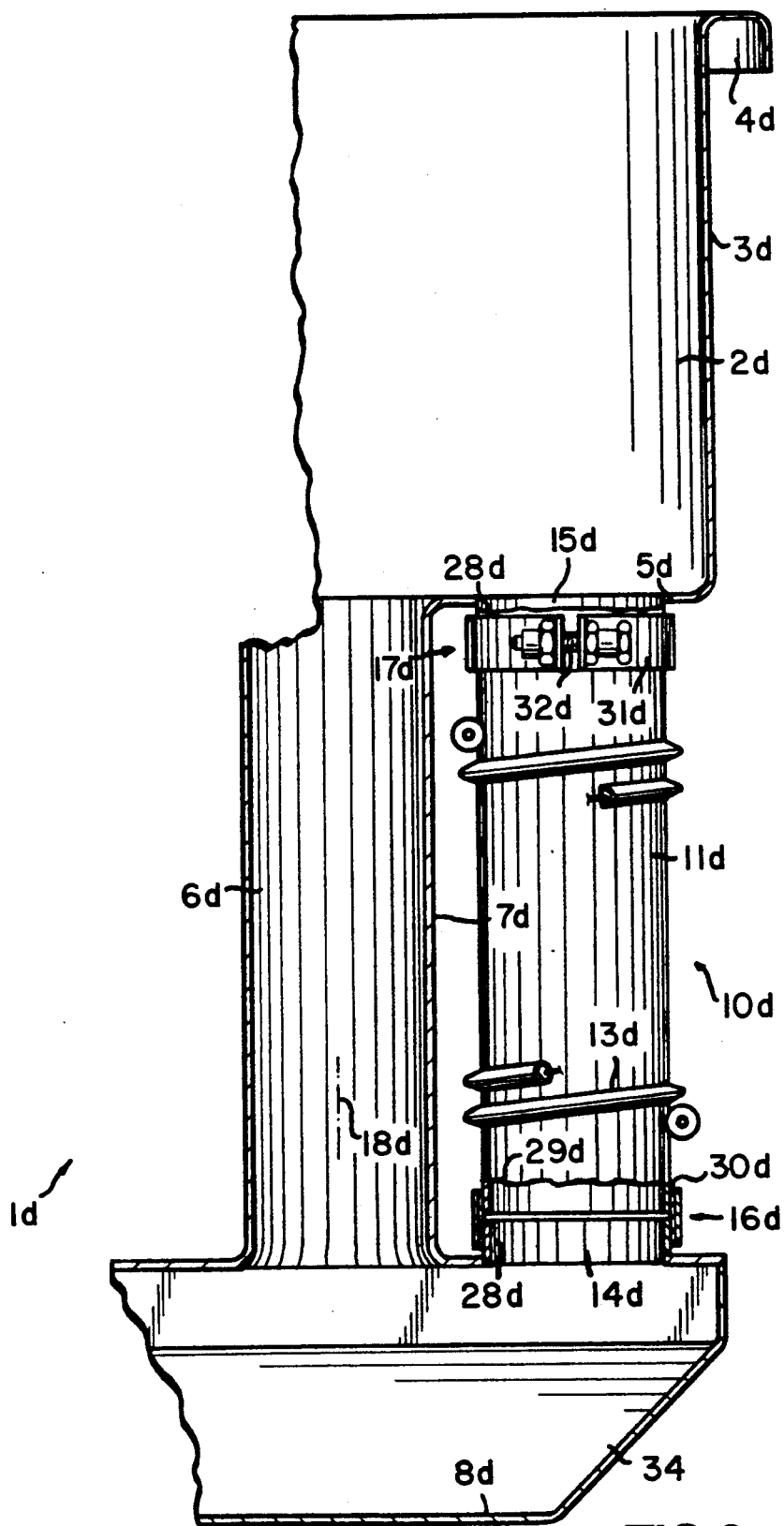
FIG. 9 is another embodiment of a fluid heater constructed as a deep fat fryer, partly in section.

In the case of a deep fat fryer 1d according to FIG. 9, pipes 11d of passage heater 10d are once again formed by identical, linear pipe sections with flange-free end faces at right angles to their central axes, which can be particularly easily fitted and manufactured. Connections 16d, 17d are in each case formed by the associated pipe connection 28d and the associated pipe end 29d of pipe 11d, a band or belt seal 30d placed around the annular clearance of the almost abutting end faces and a pipe bracket 31d placed around said seal. Pipe bracket 31d, with the aid of a tangential pipe bracket or clip 32d, can be so tightened against the circumferential surfaces of the pipe connection and pipe 11d, that pipe connection 28d and pipe 11d can slightly axially move with respect to one another under the thermal stresses which occur.

At its lower end, fluid return 6d passes into a widened feed chamber 34 for feeding fluid heater 10d. In plan view said chamber 34 can have roughly the same width extension (i.e., width) as fluid chamber 2d, but appropriately less of a height extension than fluid chamber 2d and the width extension of feed chamber 34 can decrease in a downward direction. This feed chamber 34 is common to all the tubular passage heaters 10d and, in the case of using the fluid heater 1d, can be used as a relatively large-volume cold zone for the fat, oil, etc. to be heated and therefore as a sump for solid particles, which can consequently be prevented from returning into the heating circuit. The covering or connecting wall of the feed chamber 34 for passage heater 10d is appropriately parallel to base wall 5d and defines, with base wall 5d and with the upright casing wall 7d of the return duct 6d, a reentrant recess with respect to casing wall 3d and the corresponding, upright boundary wall of feed chamber 34, in which all the passage heaters 10d can be so arranged that they are set back with respect to said walls or laterally recessed by the inwardly directed shoulder at the lower edge of base wall 5d to occupy at least one lateral outer niche laterally recessed with respect to said upright outer sidewall 3d of said fluid chamber 2d, and are consequently very well protected. As shown in FIG. 9, the niche is defined below bottom wall 5d of fluid chamber 2d, and above the upper wall of feed chamber 34, which are substantially equal in size, as shown.

To a certain extent, upright casing wall 7d can be exposed to the thermal radiation of heating resistor 13d, so that the fluid in fluid return 6d is not further cooled. Upright wall 7d is laterally disposed relative to passage heater 10d and defines both a boundary return duct 6d and an inner boundary of the niche for passage heater 10d. In the case of using the fluid heater 1d as a water or boiling water heater, or as a boiler, the feed chamber 34 can serve as lime deposition chamber, while at least one of the walls thereof, for example the base wall, can be at least partly removable as a cover, so as to permit easy emptying and/or cleaning.

All the laterally adjacent passage heaters 10d form together with their common fluid chamber 2d, the fluid return 6d and common feed chamber 34, a circulation or rotary heater, traversed by fluid flowing from the chambers 2d, 34 through the two groups of associated passage ends at the top and bottom of passages or ducts 6d, 10d, to define a circuit for constant reheating, so that it always has the desired temperature at the requisite point in the fluid chamber 2d.

According to a particularly advantageous further development of the invention the fluid return also forms a component or assembly unit separate from the fluid chamber, e.g. being formed by a separate and in particular tubular duct located outside the fluid chamber and associated with the spatial arrangement of the passage heater in such a way that it constitutes a pipe part joined thereto. The fluid return can be formed by at least one pipe arranged in grid-like manner with the passage heaters, it being possible to equip with a heater those pipes used as the fluid return, so that they can be used alternatively as passage heater and fluid return by switching the heater on and off and consequently different flow situations can be produced. It is particularly advantageous if all the passage heaters form a closed assembly group, which can be connected as an entity by at least one flange to a lower and/or upper fluid chamber. At least one fluid return can form a component thereof, so that a circulating heater assembly is formed, whose pipes are appropriately reciprocally contact-free between their ends and have no direct connection, while at least their upper or lower ends are so interconnected by the plate-like or wall-like or cover-like flange, that their end openings are located in said flange.

Figure 10:
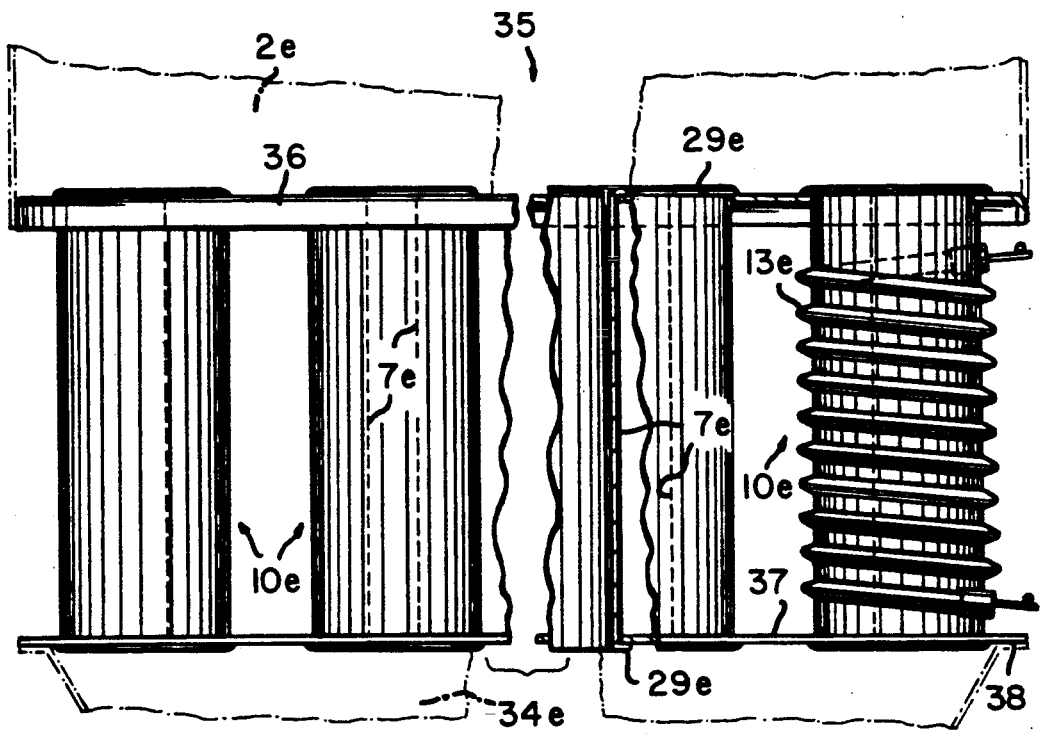
FIG. 10 is a further fluid heater suitable for deep fat fryers, water heaters and similar fluid heating means as a closed fittable assembly.
Figure 11:
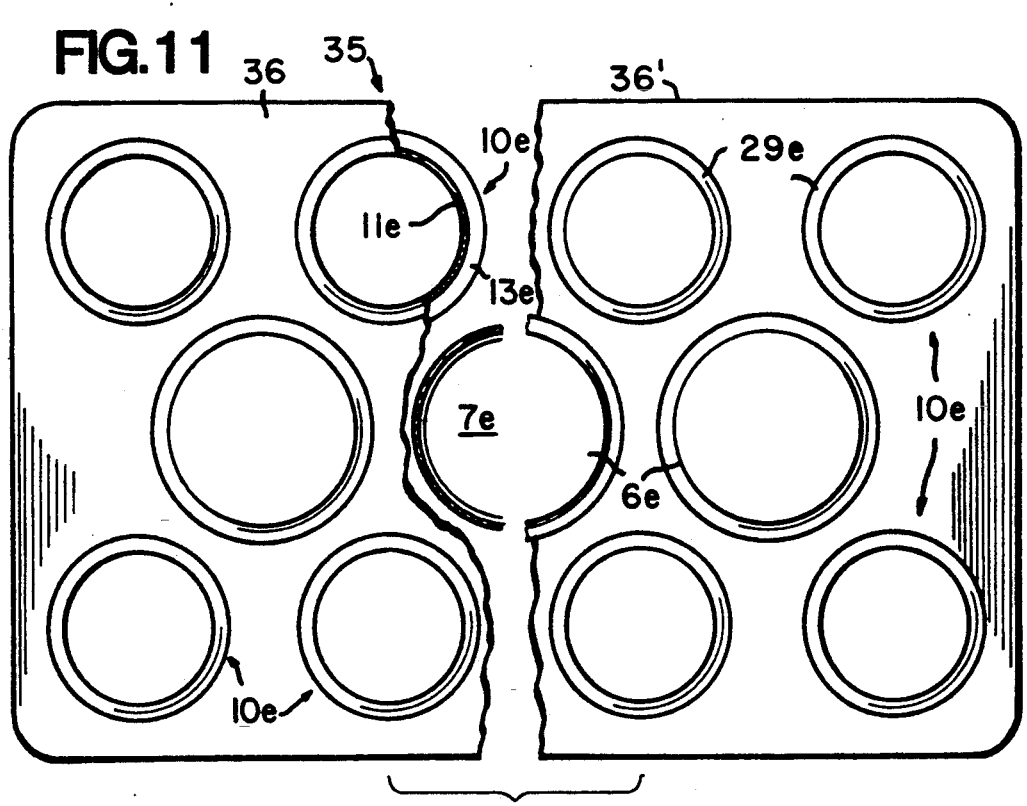
FIG. 11 is the fluid heater according to FIG. 10 in part sectional plan view.

FIGS. 10 and 11 show such an assembly 35 with two parallel rows of parallel passage heaters 10e. Between said two rows is provided another row with corresponding pipes as the fluid return 6e. The pipes 7e can have a larger diameter than the pipes 11e of passage heaters 10e, but are preferably of the same size. Pipes with a diameter between 20 and 70 mm, preferably 40 mm, have proved to be particularly advantageous. The ends of pipes 11e, 7e pass through the flanges 36, 37 and are constructed as beaded edges 29e applied and optionally soldered or otherwise sealingly fixed to the respective surface. If the two flanges are identically constructed, the assembly can optionally be fitted in substantially identically acting manner in any random reversing position.

According to FIG. 10 there are two different flanges 36, 37, whereof the lower is constructed in planar plate-like manner up to its outer circumference, while the upper flange 36 has an angled marginal web 36 on its outer circumference, which is directed away from the center of the pipe or, as shown, is directed towards the center thereof. Thus, in this case the invention is embodied in a heating assembly, which has a given number of passage heaters and return pipes, which are welded to base and front plates at flanges or marginal webs. This heating assembly can be connected to any random form or fluid chamber 2e, 34e. Casing well 3e can be fixed in to detachable manner or by welding to the marginal web or to the outer circumference of flange 36. The edge of the flange can also be constructed as a melt-off or fusible edge 38 in such a way that it can be welded without any addition of welding material through partial melting directly to a further wall part, in particular engaging therewith in plane-identical manner on the common edges. In FIGS. 10 and 11 the equally large flanges 36, 37 are arranged, in plan view, in rectangular and in particular elongated-rectangular and congruent manner, all the pipes having a spacing from one another which is at the most as large as the width extension or diameter thereof and in particular at the most as large as half the diameter thereof. Through the tubular construction of the passage heaters, very large heated surfaces are obtained, so that heating capacities over 9 kw and up to 15 KW and more can be installed in space-saving manner in a fluid heater. By corresponding wiring of the passage heaters, as a function of requirements, the capacity can be heated in stages or continuously with the aid of a manually operable switching means. As a result of the inventive construction, there is no need for flow or guide plates. The same passage heater or assembly can be used for heating different fluids as a result of the inventive construction, e.g., either for heating fat or for heating water, without any constructional changes being necessary.

Figure 12:
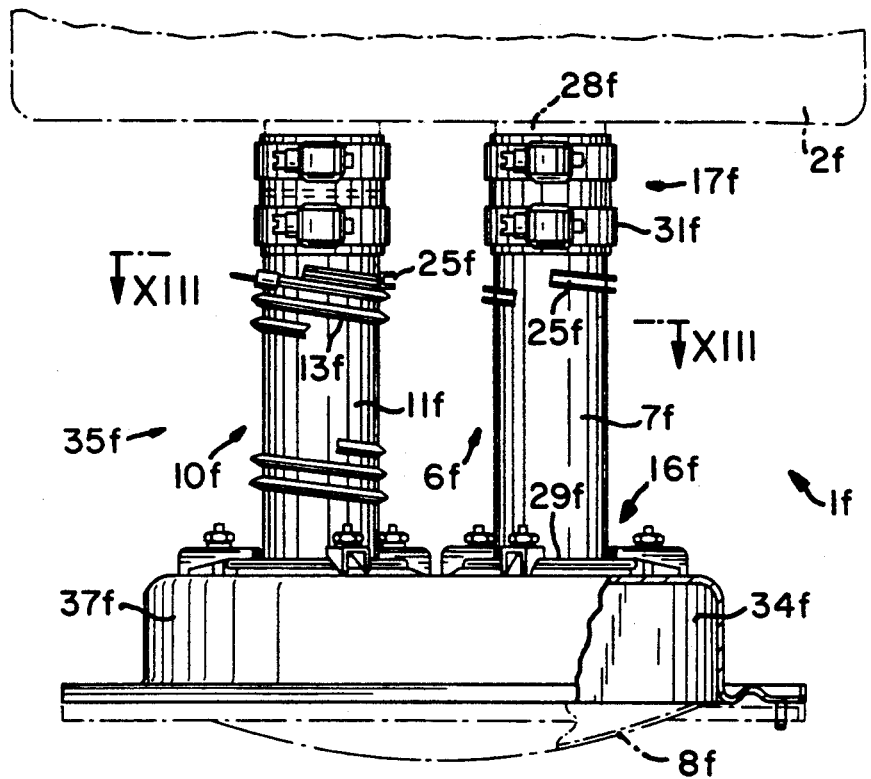
FIG. 12 is a view of a fluid heater particularly suitable for steam or hot water production.
Figure 13:
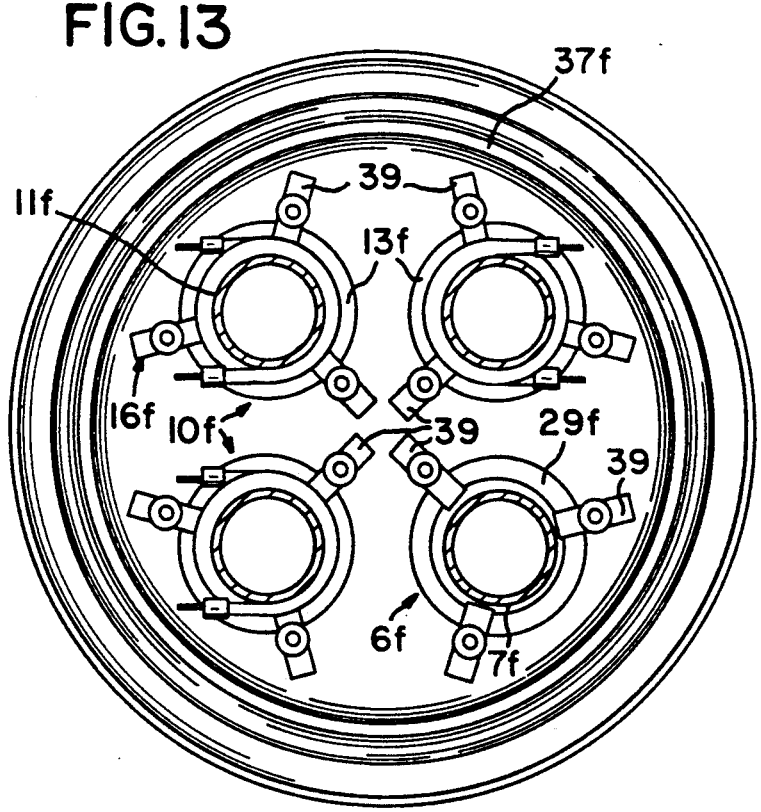
FIG. 13 is a section along line XIII—XIII of FIG. 12.
Figure 14:
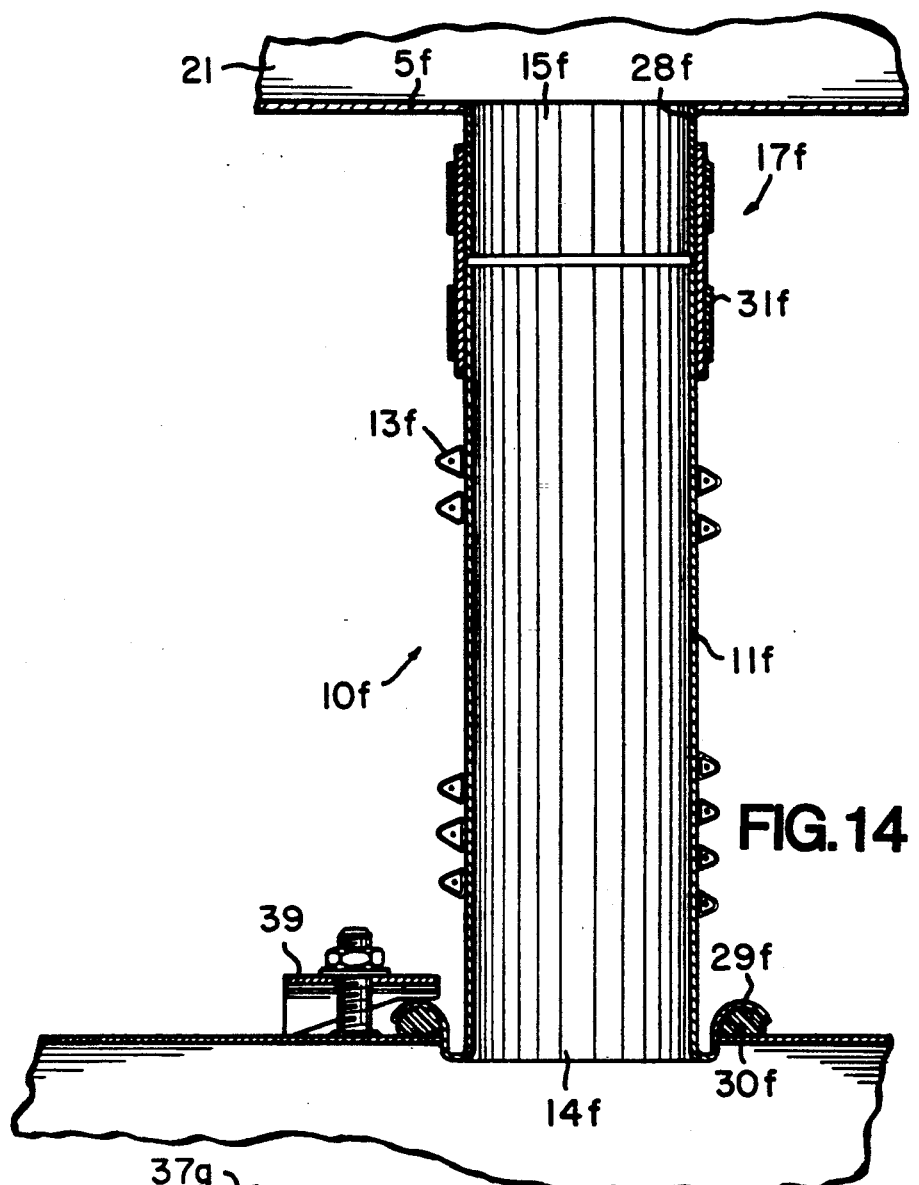
FIG. 14 is a detail of FIG. 12 in vertical section and on a larger scale.
Figure 15:
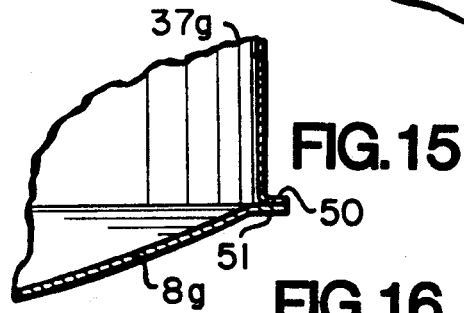
FIG. 15 is a detail of FIG. 12 on a larger scale and in a modified embodiment.
Figure 16:
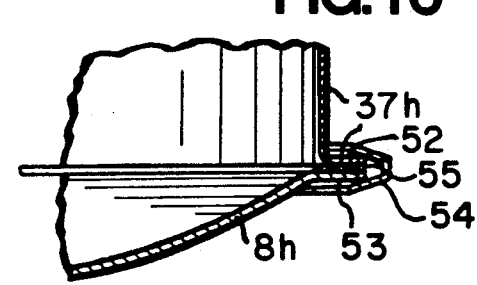
FIGS. 16 and 17 are two further embodiments in a representation according to FIG. 15.
Figure 17:
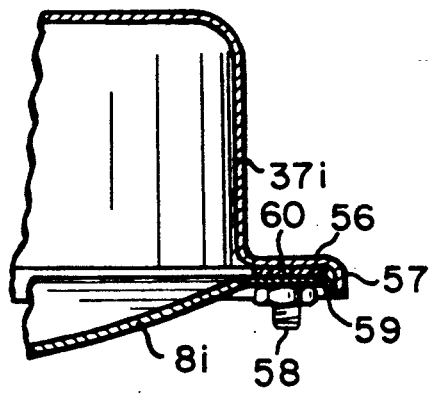

FIGS. 12 to 17 show a fluid heater 1f, which is in particular intended for means which are circular in plan view, such as boilers or containers. They can be used as boilers or fast boilers in industrial or commercial kitchens and therefore have hitherto had a double-walled boiler made from two telescoped individual boilers. In a double-walled boiler, the inner boiler is exposed on its base and outer circumference to the action of steam, while the outer boiler, whose upper edge substantially tightly engages on the inner boiler and is otherwise substantially without contact with said inner boiler defines the steam zone to the outside. Such boilers are very complicated and require a relatively large amount of water, so that the heater is always kept below the water level, thereby avoiding boiling dry. However, according to the invention, in the case of such a means a steam circulating heater is provided, in which substantially only that water quantity is required which is converted into steam, the fluid being kept in constant circulation. In this embodiment, assembly 35f only has a lower flange 37f, on whose upper base wall is detachably or interchangeably fixed a plurality of pipes on a pitch or partial circle about the central axis of the flange 37f or the fluid heater 1f. The upper ends of pipes 7f, 11f are at the same level and are detachably fixed in the vicinity of connections 17f to downwardly projecting pipe connections 28f of the base wall of fluid chamber 2f, there being two superimposed pipe clips 31f per connection 17f. The lower ends of the pipes 7f, 11f are shaped to form flanged rings 29f, which are located outside the outer circumference of pipes 7f, 11f. The lower ends of the pipes receive one ring seal 30f each, and are so secured by clamping shoes 39 against the outer face of base wall of the flange 37f, that the pipes project in centered manner by a small amount into flange 37f. This gives a relatively rigid fixing in this area. Particularly in this case, it is advantageous if the other ends of the pipes of the fluid heater 1f are fixed by means of an elastic hose made from rubber or the like mounted on pipe connections 28f and pipes 7f, 11f, so that it is easily possible to compensate dimensional or sealing tolerances. The other side of flange 37f, open through the pan opening, can be closed with a cover 8f which can be detachably fixed as shown in FIGS. 12, 16 and 17 or non-detachably fixed as shown in FIG. 15, for example by a welded joint. However, in the latter case the interior of feed chamber 34f is still accessible by removing pipes 7f, 11f. If this means is not used for steam production purposes and instead only for heating water, the feed chamber 34f is also suitable for collecting the lime which is produced.

As is shown by FIG. 12, retaining profiles or channels 25f or temperature sensors can be provided on at least one passage heater 10f, or on at least one fluid return 6f or on both of these, so that it is possible to control the heating capacity, both on the basis of the inflow temperature and the outflow temperature. The retaining profile 25f fitted to the outer circumference of pipe 7f of the fluid return 6f is adjacent to the upper end thereof and appropriately receives the temperature sensor of a temperature regulator controlling the heating resistors 13f. The retaining profile 25f or the associated temperature sensor fitted to the outer circumference of pipe 11f of passage heater 10f is also located in the vicinity of the upper pipe end and immediately adjacent to the top turn of heating resistor 13f, the associated temperature sensor appropriately controlling a thermal cutout, and is therefore suitable for preventing running dry. This temperature sensor is not only influenced by the pipe or fluid temperature, but also directly by heating resistor 13f, so that it very rapidly responds. The retaining profiles 25f are appropriately fixed in highly thermally conductive manner by a metallic intermediate layer adhering to the associated surface thereof, as well as in the surface of pipe 7f or 11f and therefore also in the pores of these surfaces. Retaining profile 25f or the temperature sensor surrounds the associated pipe approximately over the entire circumference thereof, preferably helically with the same pitch as the heating resistor 13f.

According to FIG. 15, the edge of the casing of flange 37g remote from the pipes is shaped to an outwardly directed ring flange 50, which is suitable as a fusible edge for direct welding to the edge 51 of base wall 8g.

In the case of the embodiment according to FIG. 16 a similar ring flange 52 of flange 37h is provided for detachable fixing of edge 53f of base 8h by means of a tapered flange connection 54. The ring flange and a corresponding ring flange of base 8h brace against one another, a ring seal 55 with two obtuse-angled, conical, inner ring faces being interposed therebetween.

In the embodiment according to FIG. 17, the ring flange 56 of flange 37i also has an outer, bent ring edge 57. Staybolts 58 are fixed by welding or the like to the ring flange, so that edge 59 of base 8i can be detachably fixed, a flat ring seal 60 being interposed therebetween. A similar fixing procedure is provided in the embodiment according to FIG. 12, but the ring flange of flange 37f forms an annular groove for receiving an O-ring-like seal, so that unlike the case of the embodiment of FIG. 17, there is no need for the staybolts to traverse the seal.

Figure 18:
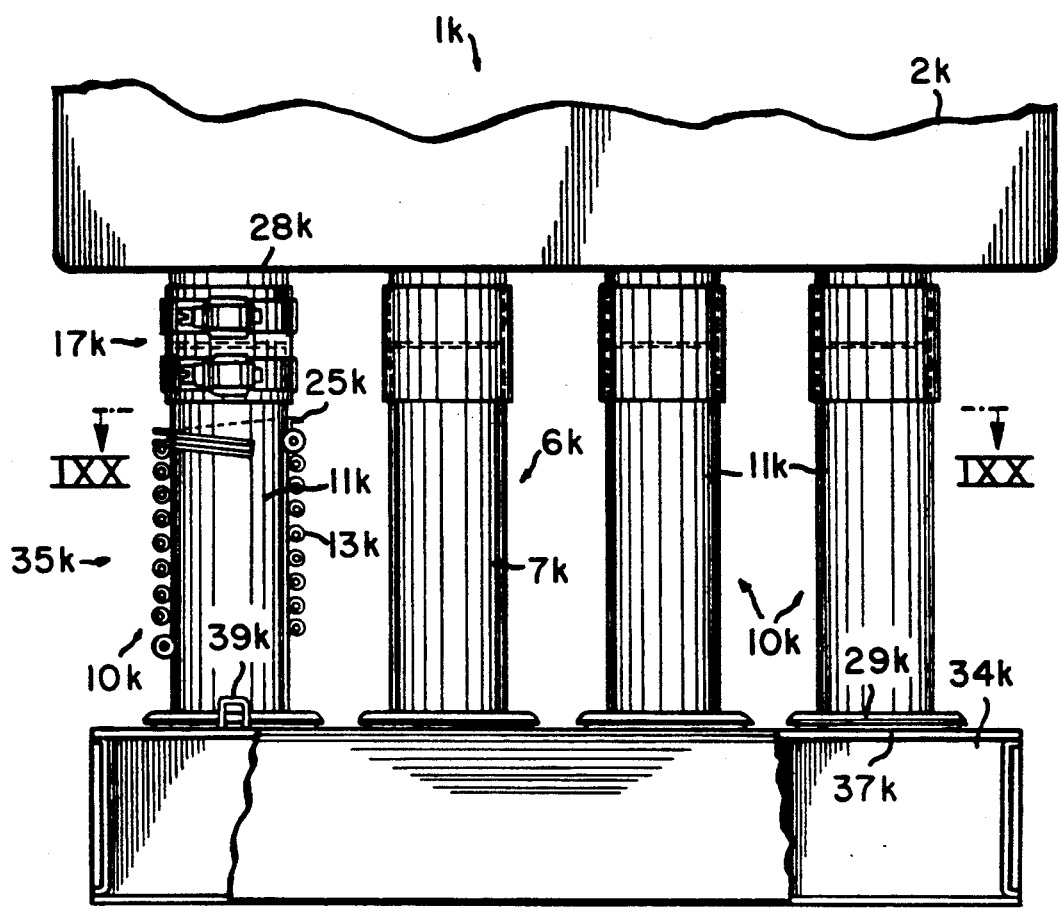
FIG. 18 is a view of another heater.
Figure 19:
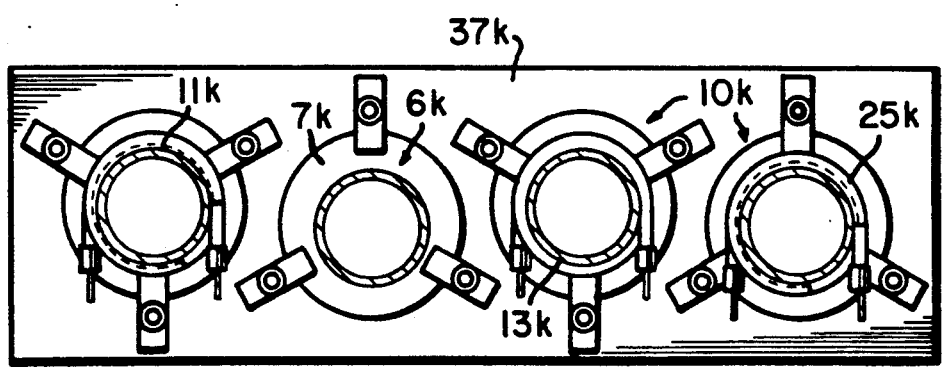
FIG. 19 is a section along line XIX—XIX of FIG. 18.

Particularly in the case of the embodiment according to FIGS. 12 to 17, the fluid chamber is suitable for forming an outer boiler for an inner boiler inserted therein as the actual cooking vessel, which is then exposed to steam action. However, the fluid chamber can also directly form the cooking vessel, e.g. an industrial kitchen steam finishing means. In this case a construction of the fluid heater 1k according to FIGS. 18 and 19 is particularly suitable. In said embodiment, all the passage heaters 10k and at least one fluid return 6k are juxtaposed in a single row, so that there is an elongated-rectangular and therefore very space-saving basic shape of the fluid heater 1k. The latter can be connected adjacent to an outer wall of fluid chamber 2k, adjacent to its rear wall and can be housed in the switching area located below the boiler. The outlets 15k of the passage heaters 10k or corresponding inlets of the fluid return 6k can be sealed in an appropriate manner to prevent penetration by the product being cooked.

I claim:

1. In combination with a fluid chamber having a base wall and an upright outer sidewall, said upright outer sidewall defining a width extension and a height extension of said fluid chamber, a fluid heater comprising:
   at least one tubular passage heater, each having an upper outlet opening issuing into said fluid chamber, and defining a heat flow passage for heating fluid flowing therethrough;
   at least one return duct disposed in a flow path connecting said fluid chamber to a lower inlet opening of each heated flow passage defined by the at least one tubular passage heater, said flow path including a feed chamber disposed below said base wall of said fluid chamber;
   said base wall connected to an upper end of at least one said at least one passage heater; and,
   an upper wall of said feed chamber being connected to a lower inlet end of each of said at least one passage heater, wherein each of said at least one passage heater is disposed in at least one lateral outer niche laterally recessed with respect to said upright outer sidewall of said fluid chamber, said base wall of said fluid chamber defining a top boundary of said at least one niche and said upper wall of said feed chamber defining a bottom boundary of said at least one niche, the feed chamber being widened with respect to said at least one return duct and with respect to said at least one tubular passage heater, said at least one return duct connecting said fluid chamber with each said inlet opening via said feed chamber.

2. The combination according to claim 1, wherein an upright wall in said niche connects said base wall of said fluid chamber and said top wall of said feed chamber.

3. The combination according to claim 1, wherein the upright wall of each of said at least one return duct defines the inner boundary of at least one niche.

4. The combination according to claim 3, wherein said upright wall of each return duct is exposed to heat radiation from said at least one passage heater.

5. The combination according to claim 1, wherein said feed chamber has a width extension substantially equal to the width extension of the fluid chamber, said feed chamber having a height extension smaller that the height extension of the fluid chamber.

6. The combination according to claim 1, wherein said feed chamber has a width extension decreasing in a downward direction.

7. The combination according to claim 1, wherein said top boundary and said bottom boundary of said niche are substantially equal to size.

8. The combination according to claim 1, wherein each said at least one passage heater together with at least one member defined by said base wall of said fluid chamber and said upper wall of said feed chamber provides an assembly unit constructed for attachment to said fluid chamber and to said feed chamber, said assembly unit including means at least partially defining said at least one return duct.

9. The combination according to claim 8, wherein said assembly unit is provided for attachment to said fluid chamber and said feed chamber by welding of marginal webs.

10. The combination according to claim 1, wherein said base wall of said fluid chamber has an inwardly directed shoulder at the bottom edge of said upright outer sidewall of said fluid chamber.

11. The combination according to claim 1, wherein a plurality of said passage heaters are provided, with the passage heaters being laterally adjacent to one another, thereby forming a heater group of at least one heater row, said heater group substantially extending over a length extension of said at least one niche, said length extension corresponding to a length extension of said fluid chamber.

12. The combination according to claim 1, comprising a plurality of laterally adjacent passage heaters connected to a common fluid chamber base wall and a common feed chamber top wall.

13. The combination according to claim 1, comprising a plurality of heated flow passages, each of said heated flow passages having a width extension, laterally adjacent ones of said heated flow passages having a lateral spacing from one another smaller than said width extension.

14. The combination according to claim 1, wherein a plurality of the tubular passage heaters are arranged within said at least one niche.

15. The combination according to claim 1, wherein a width extension of at least one said heated flow passage is of a size defined between substantially equal to and larger than a width extension of said at least one return duct.

16. The combination according to claim 1, wherein each heated flow passage is substantially linear between said outlet opening and said inlet opening, said outlet opening and said inlet opening being formed by tube openings, said outlet opening being open to and accessible from an open upper side of said fluid chamber.

17. The combination according to claim 1, comprising a plurality of passage heaters fromed as a unitary assembly having two groups of associated passage ends at a top and bottom of the assembly, respectively, the top group including outlet ends of the passage heaters and the bottom group including inlet ends of the passage heaters.

18. The combination according to claim 1, wherein each at least one said at least one passage heater is electrically heated and by means of a thermal siphon action of fluid, circulates a continuously reheated flow of fluid through the at least one flow passage and the fluid chamber.

19. The combination according to claim 1, wherein each said passage heater is removably arranged relative to the fluid chamber, as defines a removable subassembly, each said passage heaters being detachably fixed to said fluid chamber base wall and to said feed chamber top wall by releasable coupling means.

20. The combination according to claim 1, comprising a heating resistor arranged on an outer circumference of each said passage heater operable to heat fluid flowing through said passage heater.

21. The combination according to claim 1, wherein each passage heater is formed by a pipe and comprises a heating resistor in thermal communication with said passage heater and operable to heat fluid flowing through said passage heater, said heating resistor having an outer metallic tube metallically connected to said pipe.

22. The combination according to claim 1, wheerein the at least one tubular passage heater is formed by a pipe section and a heating resistor helically surrounds the pipe section for heating fluid flowing through said passage heater.

23. The combination according to claim 1, wherein each said passage heater is substantially cylindrical and of substantially equal internal diameter throughout its length.

24. The combination according to claim 1, wherein a plurality of said passage heaters are provided, each of said plurality of passage heaters being a linear heated pipe section, said pipe sections being substantially parallel and of equal size.

25. The combination according to claim 1, wherein said feed chamber is common for all of a plurality of said passage heaters, said feed chamber and said at least one fluid return duct being disposed below the fluid chamber, all of the passage heaters having upper outlet ends communicating with said fluid chamber and lower inlet ends communicating with the feed chamber.

26. The combination according to claim 1, wherein the at least one return duct is formed by a member separate from the fluid chamber.

27. The combination according to claim 1, wherein each of the at least one return duct is formed by a substantially unheated pipe otherwise similar to and disposed adjacent to the at least one passage heater, heater the at least one passage heater being formed by a pipe.

28. The combination according to claim 1, wherein the at least one return duct forms a closed circulating heater assembly with the at least one passage heater.

29. The combination according to claim 1, further comprising a temperature sensor mounted on the at least one flow passage.

30. The combination according to claim 29, wherein the temperature sensor is positioned on an outer surface of the at least on heated flow passage.

31. The combination according to claim 29, further comprising a carrying profile mounted on the at least one heated flow passage for receiving and at least partially enveloping the temperature sensor in direct metallic heat conducting connection over more than half the length of the temperature sensor.

32. The combination according to claim 31, wherein the carrying profile is connected to the at least one flow passage in substantially direct thermally conductive manner.

33. The combination according to claim 29, wherein the temperature sensor is filled with an expansion fluid.

34. The combination according to claim 1, wherein the fluid chamber is adapted as a fat container for a deep fat fryer and the feed chamber is an unheated fat sump chamber.

35. The combination according to claim 1, wherein the at least one heated flow passage is constructed as a water heater for a boiler and the feed chamber is adapted as an openable collecting container for lime and sediment.

* * * * *